US012689641B2

(12) United States Patent
Sethi et al.

(10) Patent No.: US 12,689,641 B2
(45) Date of Patent: Jul. 21, 2026

(54) ATTACK PREVENTION FOR TRANSMISSION CONTROL PROTOCOL LAYER

(71) Applicant: Dell Products L.P., Round Rock, TX (US)

(72) Inventors: Parminder Singh Sethi, Ludhiana (IN); Shree RamaKrishna Rathinasamy, Round Rock, TX (US); Anay Kishore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 18/486,709

(22) Filed: Oct. 13, 2023

(65) Prior Publication Data

US 2025/0126142 A1      Apr. 17, 2025

(51) Int. Cl.
H04L 9/40 (2022.01)

(52) U.S. Cl.
CPC ...... H04L 63/1425 (2013.01); H04L 63/0236 (2013.01); H04L 63/0281 (2013.01)

(58) Field of Classification Search
CPC ....................... H04L 63/1425; H04L 63/0236
See application file for complete search history.

(56) References Cited

U.S. PATENT DOCUMENTS

| | | | | |
|---|---|---|---|---|
| 7,854,000 | B2 * | 12/2010 | Venkat | H04L 63/1458 726/22 |
| 8,190,723 | B2 * | 5/2012 | Datla | H04L 41/022 709/224 |
| 9,154,479 | B1 * | 10/2015 | Sethi | H04L 63/20 |
| 9,749,354 | B1 * | 8/2017 | Diggins | H04L 63/1458 |
| 10,652,254 | B2 * | 5/2020 | Kuperman | G06N 3/09 |
| 11,252,091 | B1 * | 2/2022 | Singh | H04L 41/16 |
| 11,258,884 | B1 * | 2/2022 | Reiner | H04L 67/63 |
| 2002/0091801 | A1 * | 7/2002 | Lewin | H04L 65/613 709/219 |
| 2002/0156886 | A1 * | 10/2002 | Krieski | H04L 43/022 709/224 |
| 2003/0135625 | A1 * | 7/2003 | Fontes | H04L 63/1458 709/228 |
| 2004/0141462 | A1 * | 7/2004 | Mistry | H04L 47/10 370/229 |
| 2004/0177275 | A1 * | 9/2004 | Rose | H04L 63/0236 713/160 |

(Continued)

OTHER PUBLICATIONS

Wikipedia. "SYN Flood," https://en.wikipedia.org/wiki/SYN_flood, May 8, 2023, 2 pages.

(Continued)

*Primary Examiner* — Hieu T Hoang
(74) *Attorney, Agent, or Firm* — Ryan, Mason & Lewis, LLP

(57) ABSTRACT

A method comprises receiving one or more data packets corresponding to at least one communications protocol request, and scanning the one or more data packets to validate one or more elements corresponding to the at least one communications protocol request. The at least one communications protocol request is rejected in response to invalidating the one or more elements, and the at least one communications protocol request is forwarded to one or more servers in response to validating the one or more elements.

20 Claims, 10 Drawing Sheets

800

(56) References Cited

U.S. PATENT DOCUMENTS

| | | | | |
|---|---|---|---|---|
| 2005/0060442 A1* | 3/2005 | Beverly | ................. | H04L 47/27 |
| | | | | 710/33 |
| 2005/0259644 A1* | 11/2005 | Huitema | .............. | H04L 69/161 |
| | | | | 709/224 |
| 2007/0110053 A1* | 5/2007 | Soni | ....................... | H04L 69/22 |
| | | | | 370/389 |
| 2007/0143846 A1* | 6/2007 | Lu | ........................ | G06F 21/554 |
| | | | | 726/23 |
| 2009/0113420 A1* | 4/2009 | Pawlowski | ............ | H04L 67/10 |
| | | | | 718/1 |
| 2011/0149736 A1* | 6/2011 | Kashyap | ............ | H04L 63/1416 |
| | | | | 370/235 |
| 2012/0203893 A1* | 8/2012 | Williams | ............. | H04L 69/163 |
| | | | | 709/224 |
| 2014/0029620 A1* | 1/2014 | Zheng | .................... | H04L 69/16 |
| | | | | 370/392 |
| 2015/0207815 A1* | 7/2015 | Cai | .................... | H04L 63/1408 |
| | | | | 726/22 |
| 2019/0089679 A1* | 3/2019 | Kahalon | ................. | H04L 47/20 |
| 2019/0141168 A1* | 5/2019 | Bhandari | ............. | H04L 43/028 |
| 2020/0220794 A1* | 7/2020 | Barabash | ............. | H04L 43/022 |
| 2020/0396207 A1* | 12/2020 | Motwani | ............ | G06F 11/3476 |
| 2022/0078205 A1* | 3/2022 | Bjarnason | ........... | H04L 63/1425 |
| 2023/0328085 A1* | 10/2023 | Rueffer | ............... | H04L 63/1416 |
| | | | | 726/23 |
| 2024/0031389 A1* | 1/2024 | Canzanese, Jr. | .... | H04L 63/1425 |

OTHER PUBLICATIONS

Wikipedia. "Transport Layer," https://en.wikipedia.org/wiki/Transport_layer, Sep. 27, 2023, 6 pages.
Phoenix Nap, "What is a Web Client?" https://phoenixnap.com/glossary/web-client#:~:text=A, Accessed Oct. 5, 2023, 2 pages.
Strong DM, "Forward Proxy vs. Reverse Proxy: The DifferenceExplained," https://www.strongdm.com/blog/difference-between-proxy-and-reverse-proxy, Accessed Oct. 5, 2023, 15 pages.
Sensu Docs, "TCP Stream Handlers Reference," https://docs.sensu.io/sensu-go/latest/observability-pipeline/observe-process/tcp-stream-handlers/#:~:text=TCP, Accessed Oct. 5, 2023, 12 pages.
Cloudfare, "What is a Network switch? Switch vs. Router," https://www.cloudflare.com/learning/network-layer/what-is-a-network-switch/, Accessed Oct. 9, 2023, 6 pages.
K. Yasar et al., "Network Switch," https://www.techtarget.com/searchnetworking/definition/switch?Offer=abMeterCharCount_var3, Accessed Oct. 9, 2023, 8 pages.
M. Rouse, "Hop," https://www.techopedia.com/definition/2411/hop, Apr. 23, 2018, 9 pages.

* cited by examiner

100

104

NETWORK(S)

APPLICATION CLIENT DEVICE 102-1

APPLICATION CLIENT DEVICE 102-2

APPLICATION CLIENT DEVICE 102-M

DATACENTER 110

FIREWALL 120

CLIENT MODULE 130

NETWORK SWITCH 140

STORAGE FABRIC MODULE 150

SERVER 160-1

SERVER 160-2

SERVER 160-3

SERVER 160-S

STORAGE MODULE 170

300

301 START

302 Receive Data From Application Servers

303 Validate with forward proxy rules

Valid

304 Capture Headers And Fields Data

305 Send To User

Invalid

306 Reject Request

307 Store Data In Database

308 END

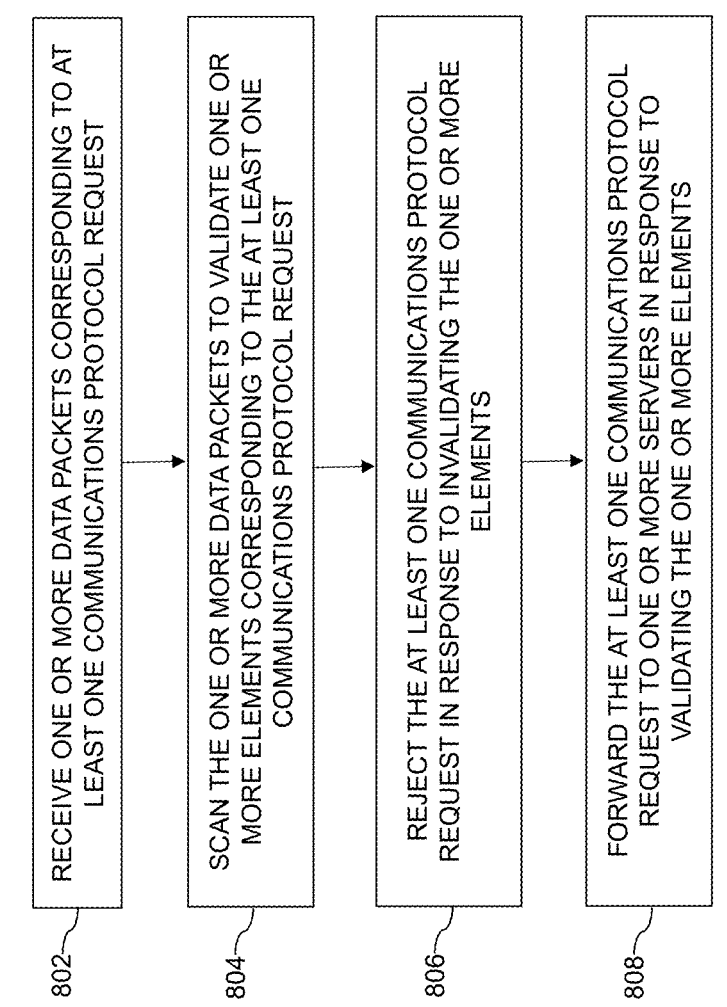

800

RECEIVE ONE OR MORE DATA PACKETS CORRESPONDING TO AT LEAST ONE COMMUNICATIONS PROTOCOL REQUEST

802

SCAN THE ONE OR MORE DATA PACKETS TO VALIDATE ONE OR MORE ELEMENTS CORRESPONDING TO THE AT LEAST ONE COMMUNICATIONS PROTOCOL REQUEST

804

REJECT THE AT LEAST ONE COMMUNICATIONS PROTOCOL REQUEST IN RESPONSE TO INVALIDATING THE ONE OR MORE ELEMENTS

806

FORWARD THE AT LEAST ONE COMMUNICATIONS PROTOCOL REQUEST TO ONE OR MORE SERVERS IN RESPONSE TO VALIDATING THE ONE OR MORE ELEMENTS

ATTACK PREVENTION FOR TRANSMISSION CONTROL PROTOCOL LAYER

FIELD

The field relates generally to information processing systems, and more particularly to security management in connection with data transmission.

BACKGROUND

The Transmission Control Protocol (TCP) layer is an important layer for network communication and data traversal. The TCP layer performs peer validation based on, for example, Internet Protocol and port information, which can be manipulated during an attack by nefarious actors. As a result, the TCP layer may often be subject to attack. There are several types of attacks to which the TCP layer may be vulnerable. Distributed Denial of Service (DDoS) is one such attack. With DDOS, an attacker attempts to disrupt the services and/or applications by flooding a system with unwanted calls, consuming system resources. As a result, little or no resources are left for legitimate requests (hence "denial of service"). Current approaches lack adequate protections to ensure that network data in the TCP layer remains secure.

SUMMARY

Embodiments provide techniques for prevention of attacks on the TCP layer in an information processing system.

For example, in one embodiment, a method comprises receiving one or more data packets corresponding to at least one communications protocol request, and scanning the one or more data packets to validate one or more elements corresponding to the at least one communications protocol request. The at least one communications protocol request is rejected in response to invalidating the one or more elements, and the at least one communications protocol request is forwarded to one or more servers in response to validating the one or more elements.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 8 depicts a process for prevention of transport layer attacks according to an illustrative embodiment.

DETAILED DESCRIPTION

Figure 1:
FIG. 1 depicts an information processing system with a datacenter including an edge client module configured to prevent transport layer attacks in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous, and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises application client devices 102-1, 102-2, . . . 102-M (collectively "application client devices 102"). The application client devices 102 communicate over a network 104 with a datacenter 110. The variable M and other similar index variables herein such as K, L, N and S are assumed to be arbitrary positive integers greater than or equal to one.

The application client devices 102 can comprise, for example, Internet of Things (IoT) devices, desktop, laptop or tablet computers, mobile telephones, or other types of processing devices capable of communicating with the datacenter 110 over the network 104. Such devices are examples of what are more generally referred to herein as "processing devices." Some of these processing devices are also generally referred to herein as "computers." The application client devices 102 may also or alternately comprise virtualized computing resources, such as virtual machines (VMs), containers, etc. The application client devices 102 in some embodiments comprise respective computers associated with a particular company, organization or other enterprise. In illustrative embodiments, the application client devices 102 execute client-side applications used for connecting to the datacenter 110 and one or more servers 160-1, 160-2, 160-3, . . . 160-S (collectively "servers 160") of the datacenter 110 over the network 104. A non-limiting example of a client-side application is a web browser or web application which, for example, displays web pages received from the servers 160 and allows users to interact with the servers 160.

The terms "user" or "client" herein are intended to be broadly construed so as to encompass numerous arrangements of human, hardware, software or firmware entities, as well as combinations of such entities. Transport layer attack prevention services may be provided for users utilizing one or more machine learning models, although it is to be appreciated that other types of infrastructure arrangements could be used. At least a portion of the available services and functionalities provided by the datacenter 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the datacenter 110, as well as to support communication between the datacenter 110 and connected devices (e.g., application client devices 102) and/or other related systems and devices not explicitly shown.

There are several ways a DDOS attack on the transport layer can be triggered. For example, a DDOS attack can be triggered by: (i) sending multiple TCP requests to a transport layer to initiate a new connection (synchronize (SYN) requests) from one or more sources; (ii) deploying bots in different hosts (e.g., bot army) and launching a coordinated attack on a target system (e.g., on the transport layer) to overwhelm the system; (iii) triggering reset (RST) packets to the transport layer to reset and disrupt/abort valid connections; (iv) triggering FIN packets to the transport layer to terminate valid TCP connections between clients (e.g., application client devices 102) and servers (e.g., servers 160); (v) launching a large amount of acknowledgement (ACK) packets to a transport layer indicating acknowledgement of received data to a target; and (vi) launching a large amount of malformed data packets to a transport layer with incorrect values to confuse a system. Although the embodiments are discussed in connection with TCP, the embodiments are not necessarily limited thereto and may be applicable to other transport layer protocols such as, but not necessarily limited to, user datagram protocol UDP and stream control transmission protocol (SCTP).

In an attempt to address the above technical problems, the illustrative embodiments advantageously provide a client module in a datacenter configured to scan data packets to identify and invalidate the data packets with elements indicative of a transport layer attack (e.g., DDOS attack). As an additional advantage, the illustrative embodiments logically separate TCP connection processing from the servers hosting web services. As a result, in a worst-case scenario where the resources of an intermediate system hosting TCP processing are consumed, the servers hosting the web services are able to continue to perform.

As an additional advantage, the embodiments leverage edge computing configurations, where client modules configured to scan data packets to identify and invalidate the data packets with elements indicative of a transport layer attack are locally deployed in datacenters and connected to a content delivery network (CDN) server which, in turn, connects to a backend server over a network.

The illustrative embodiments provide an automated framework for proactively and intelligently verifying network requests to detect flooding attacks in an edge datacenter environment. The framework is implemented to postpone the allocation of underlying resources until a network request successfully passes a suggested validation process.

Referring back to FIG. 1, the datacenter 110 in the present embodiment is assumed to be accessible to the application client devices 102 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols. The networks may comprise Internet Protocol version 6 (IPv6) and Internet Protocol version 4 (IPv4) configured networks. As explained in more detail herein, client modules are configured to be generic with respect to IP protocol to work with IPv4 and IPv6. For example, client modules can perform the verifying and other functions regardless of whether the applications are ported from IPv4 to IPv6 or vice-versa.

Some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the datacenter 110 includes a firewall 120, a client module 130, a network switch 140, a storage fabric module 150, servers 160 and a storage module 170. The client module 130 is connected between the firewall 120 and the network switch 140. The firewall 120 provides a level of network security for the datacenter 110 to and from an external network by monitoring incoming and outgoing network traffic. The firewall 120 determines whether to allow or block specific traffic based on a defined set of security rules. The firewall 120 functions as a barrier between trusted, secured and controlled internal networks and untrusted outside networks. The firewall 120 can comprise, for example, hardware and/or software.

The network switch 140 determines where (e.g., which one of the servers 160) to send incoming message frames based on, for example, media access control (MAC) address. In some embodiments, the network switch 140 maintains tables that match each MAC address to a corresponding port receiving the MAC address. In illustrative embodiments, the network switch 140 operates on the data-link layer, or Layer 2, of the Open Systems Interconnection (OSI) model. The network switch 140 can be a hardware device, software-based virtual device or combination thereof.

The network switch 140 is connected to a storage fabric module 150. The storage fabric module 150 comprises software configured to provide high-speed shared storage for elements (e.g., client module 130, servers 160, etc.) of the datacenter 110. The storage fabric module 150 is connected to a storage module 170 comprising one or more storage devices. The storage devices comprise one or more of various types of storage devices such as hard-disk drives (HDDs), solid-state drives (SSDs), flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the storage module 170. In this regard, the term "storage device" as used herein should be broadly construed to encompass all types of persistent storage media including hybrid drives.

Figure 4:
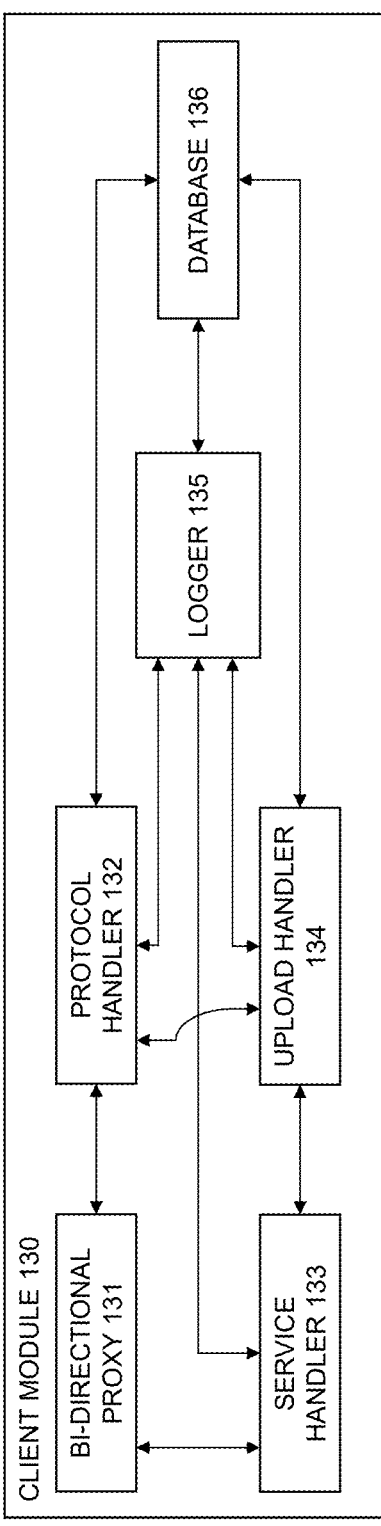
FIG. 4 depicts a block diagram of components of an edge client module configured to prevent transport layer attacks in an illustrative embodiment.

Referring to FIGS. 1 and 4, the client module 130 comprises a bi-directional proxy layer 131, a protocol handler 132, a service handler 133, an upload handler 134, a logger 135 and a database 136. The client module 130 is located in the datacenter 110 and, in illustrative embodiments, is configured to monitor datacenter web services with designated parameters and filter inbound and outbound traffic. The client module 130 works as an edge computing client sitting near the servers 160 where web applications and/or other applications are deployed. As explained in more detail in connection with FIGS. 6 and 7, clusters of client modules are connected with respective CDN servers, which will be deployed on a zone basis based on the volume of required validation and support.

Figure 6:
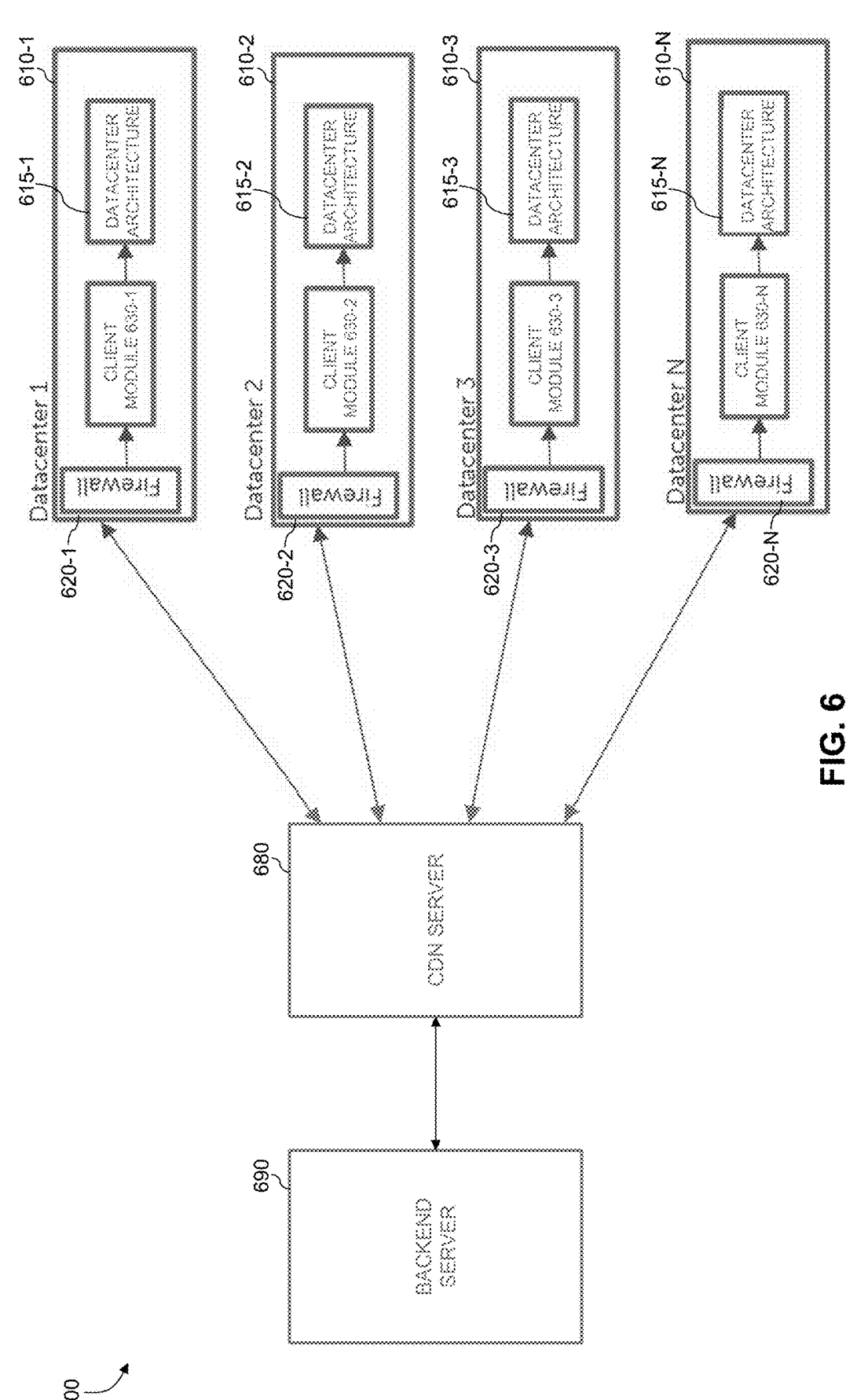
FIG. 6 depicts an architecture including multiple datacenters and corresponding edge client modules configured to prevent transport layer attacks in an illustrative embodiment.
Figure 7:
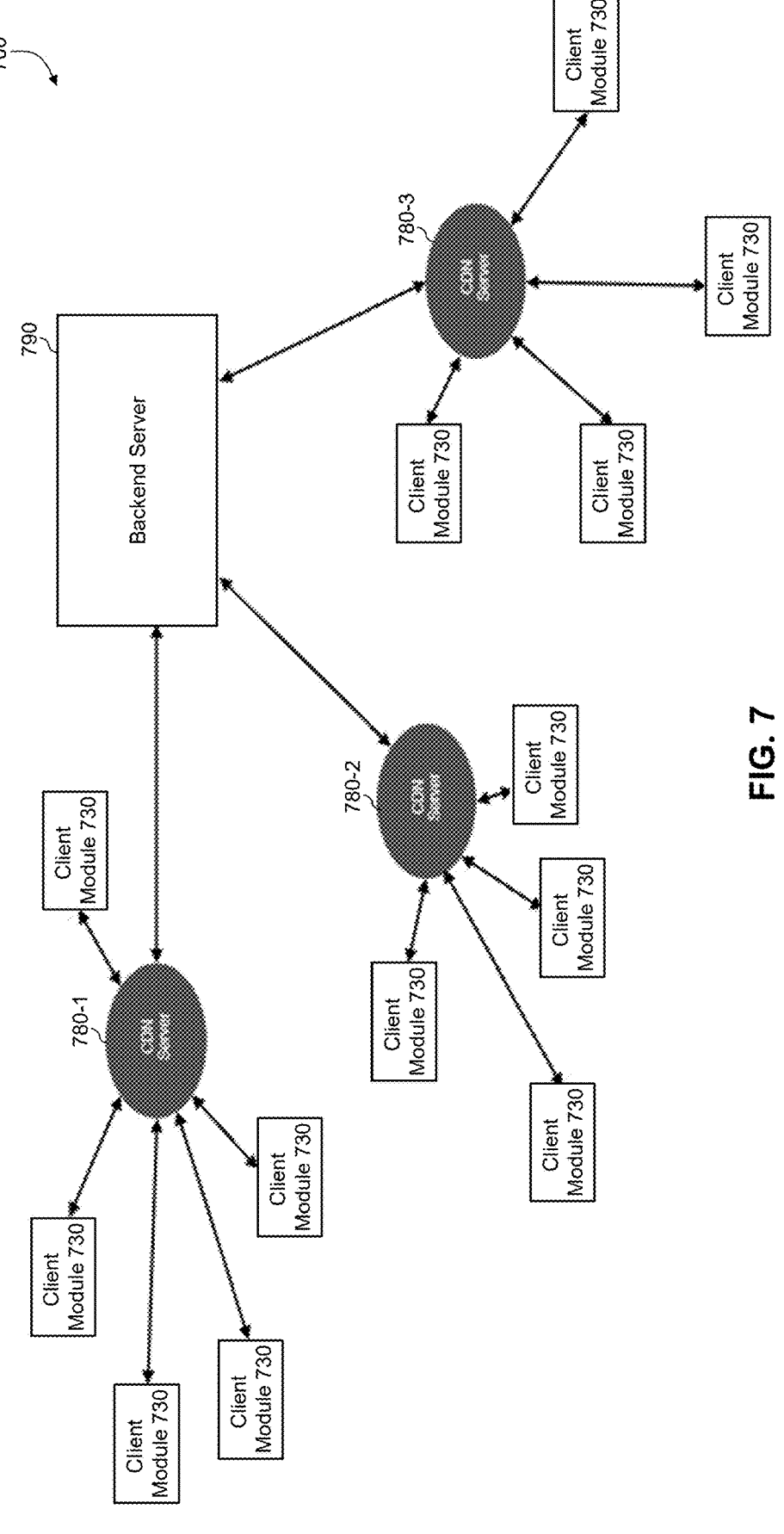
FIG. 7 depicts an architecture including multiple edge client modules connected to a backend server through respective content delivery network (CDN) servers in an illustrative embodiment.

In illustrative embodiments, the client module 130 is deployed in the datacenter 110 (e.g., customer datacenter) on a standalone machine with an operating system (OS) architecture such as, but not necessarily limited to, Windows, Linux, custom, Docker, etc. In some embodiments, the OS may be based on OS wrapper packaging by an administrator and/or root level user. Referring, for example, to FIG. 6, respective ones of a plurality of client modules 630-1, 630-2, 630-3, . . . , 630-N (collectively "client modules 630") are deployed on respective ones of a plurality of datacenters 610-1, 610-2, 610-3, . . . , 610-N (collectively "datacenters 610"). Each client module 630 is deployed between a corresponding one of a plurality of firewalls 620-1, 620-2, 620-3, . . . , 620-N (collectively "firewalls 620") and a corresponding datacenter architecture of a plurality of datacenter architectures 615-1, 615-2, 615-3, . . . , 615-N (collectively "datacenter architectures 615"). The datacenters 610, firewalls 620 and client modules 630 are the same as or similar to the datacenter 110, firewall 120 and the client module 130. The datacenter architectures 615 correspond to the remaining components of a corresponding datacenter 610 including, for example, a network switch (e.g., network switch 140), a storage fabric module (e.g., storage fabric module 150), servers (e.g., servers 160) and a storage module (e.g., storage module 170). FIG. 7 also illustrates multiple client modules 730, which are the same as or similar to the client modules 130/630.

The bi-directional proxy layer 131 filters incoming and outgoing requests and responses based on rules for different directions of data traffic (e.g., forward (outgoing) and reverse (incoming) proxy rules). The rules can be designated by, for example, the owner of the datacenter 110 and can correspond, but are not necessarily limited to, protocol, port, security level, data packet size and/or data packet component size. The bi-directional proxy layer 131 filters the requests and responses to and from the servers 160. The protocol handler 132 processes protocol (e.g., TCP) requests from different clients (e.g., web application clients via application client devices 102) from the network 104. The embodiments logically separate the protocol (e.g., TCP) connection processing from web services, which are processed by the service handler 133. The separation allows for more enhanced and efficient control of the entire process than current approaches. The logical separation decreases the load on components hosting web services by using separate components (e.g., protocol handler 132 and service handler 133) to respectively process threat detection and web/applications before being shared with the remaining components of the datacenter (e.g., datacenter architecture 615) via the upload handler 134. For example, the service handler 133 performs starting, stopping and restarting of services, monitors services, and logs appropriate messages about the services in the logger 135.

The protocol handler 132 performs multiple types of validations on protocol requests and is configured to reject malicious requests without assigning any system resources to the malicious requests. For example, the protocol handler 132 validates incoming TCP requests and determines whether there is any risk in honoring those requests. Upon successful validation, the protocol handler 132 establishes a TCP session with a client (e.g., application client device 102) and starts taking further requests. The protocol handler 132 also closes operations based on RST or FIN requests and performs different operations like TCP sequencing, flow control, etc.

The client modules 130/630/730 function as a hop between a security system and web applications running in a datacenter (e.g., datacenter 110 or 610). Advantageously, unlike conventional approaches, the client modules 130/630/730 add a layer of security in a datacenter (e.g., datacenter 110 or 610) to invalidate and reject different malicious requests before being uploaded to the remaining components of the datacenter (e.g., datacenter architecture 615) via the upload handler 134. For example, the protocol handler 132 is configured to filter out SYN requests with flags that may be irrelevant for a given situation (e.g., urgent (URG) flag to mark data as urgent or push (PSH) flag to send data immediately when the data is not crucial). The client modules 130/630/730 are also configured to mask web, application and/or database servers (e.g., their IPs/ports, etc.) from malicious requests.

In addition, outgoing responses received via the upload handler 134 will be processed by the bi-directional proxy layer 131, protocol handler 132 and service handler 133 before being transmitted from a datacenter (e.g., datacenter 110/610) to the network 104. A logger 135 logs the activities/events/processes of the components (e.g., bi-directional proxy layer 131, protocol handler 132, service handler 133, upload handler 134) of the client modules 130/630/730 and maps request details to sources and destinations.

The logged information and other data from the components of the client modules 130/630/730 is stored in a database 136. The database 136 stores data related to, for example, web services, application services, database services, proxy rules, protocol handling mechanisms, and accepted and rejected requests. The database 136 also stores hash values (e.g., secure sockets layer (SSL) level hash values) for every SYN request for which final ACK is awaited, details of active socket connections, details of earlier active socket connections which are now closed with FIN or RST requests, details of rejected SYN requests (e.g., due to timeouts), details of backend application API completed services, a list of malicious machines blocked from sending SYN requests or ACK responses, bi-directional proxy communication and filter history, details of secure upload servers (e.g., links) for periodic log uploads and details of secure catalogs (e.g., links) for periodic upgrading of application versions used by the client module 130/630/730.

Figure 5:
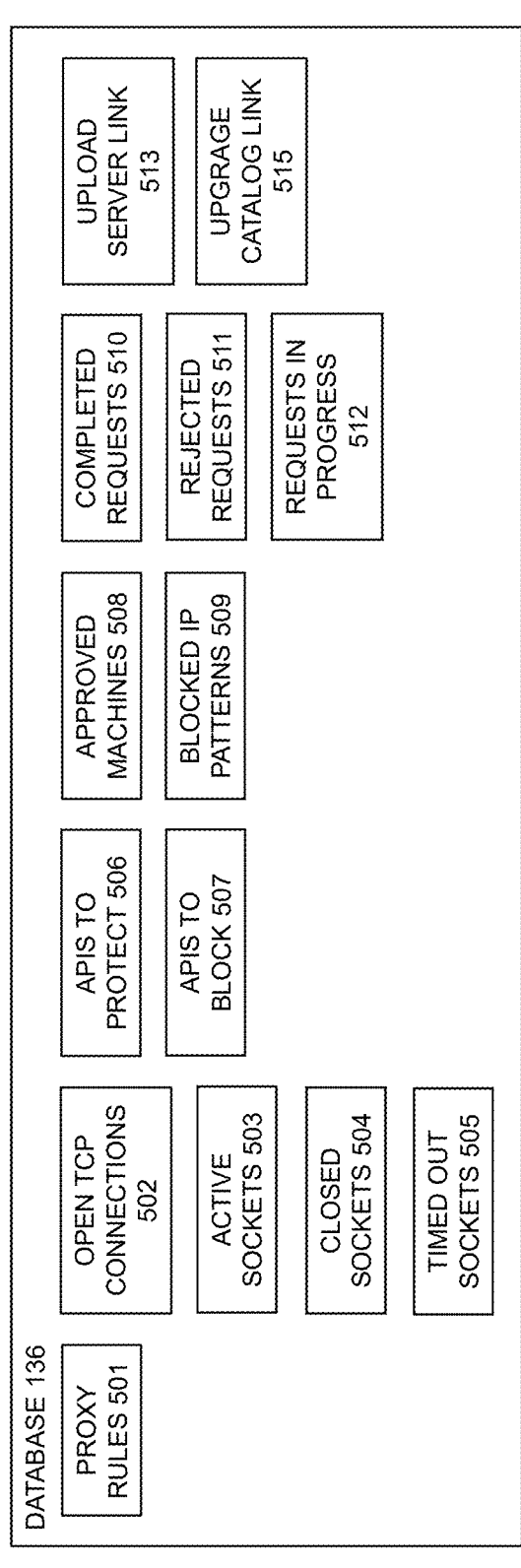
FIG. 5 depicts a block diagram of elements of a database of an edge client module in an illustrative embodiment.

For example, referring to FIG. 5, the database 136 includes, but is not necessarily limited to, proxy rules 501, open TCP (or other protocol) connections 502, active sockets 503, closed sockets 504, timed out sockets 505, APIs to protect 506, APIs to block 507, approved machines 508, blocked IP patterns 509, completed requests (e.g., transport layer requests) 510, rejected requests 511, requests in progress 512, upload server link 513 and upgrade catalog link 515. As used herein a "socket" or "network socket" refers to a software structure that is part of a network node of a computer network and serves as an endpoint for sending and receiving data across the network. The structure and properties of a socket can be defined by an API for the networking architecture. As can be understood, the logged information such as, for example, open TCP (or other protocol) connections 502, active sockets 503, closed sockets 504, timed out sockets 505, completed requests 510, rejected requests 511 and requests in progress 512 can be updated periodically and/or at designated intervals to reflect real-time information. As can be understood, the database 136 includes rules, conditions and/or links (e.g., proxy rules 501, APIs to protect 506, APIs to block 507, approved machines 508, blocked IP patterns 509, upload server link 513 and upgrade catalog link 515) under which the bi-directional proxy layer 131, the protocol handler 132 and/or other components of the client modules 130/630/730 operate.

In accordance with illustrative embodiments, the steps for TCP request validation that may be performed by the protocol handler 132 include, but are not necessarily limited to: (i) validating data packets for any structural abnormalities; (ii) validate signs of TCP flooding; and (iii) running additional types of validation. Structural abnormalities, as described in more detail herein, include but are not necessarily limited to, size of one or more header fields of a TCP request exceeding a designated threshold, incorrect source and/or destination port identified in a header field, incorrect request or response sequence number and/or acknowledgement (ACK) of data number in the one or more header fields and incorrect hash values. As explained in more detail herein, signs of TCP flooding include incorrect IP ranges and/or abnormal IP range patterns, and incorrect or abnormal ACK sequencing methodology. The additional types of validation include, for example, validation of cookies, ACK sequencing, encryption, socket connections, etc.

Figure 2:
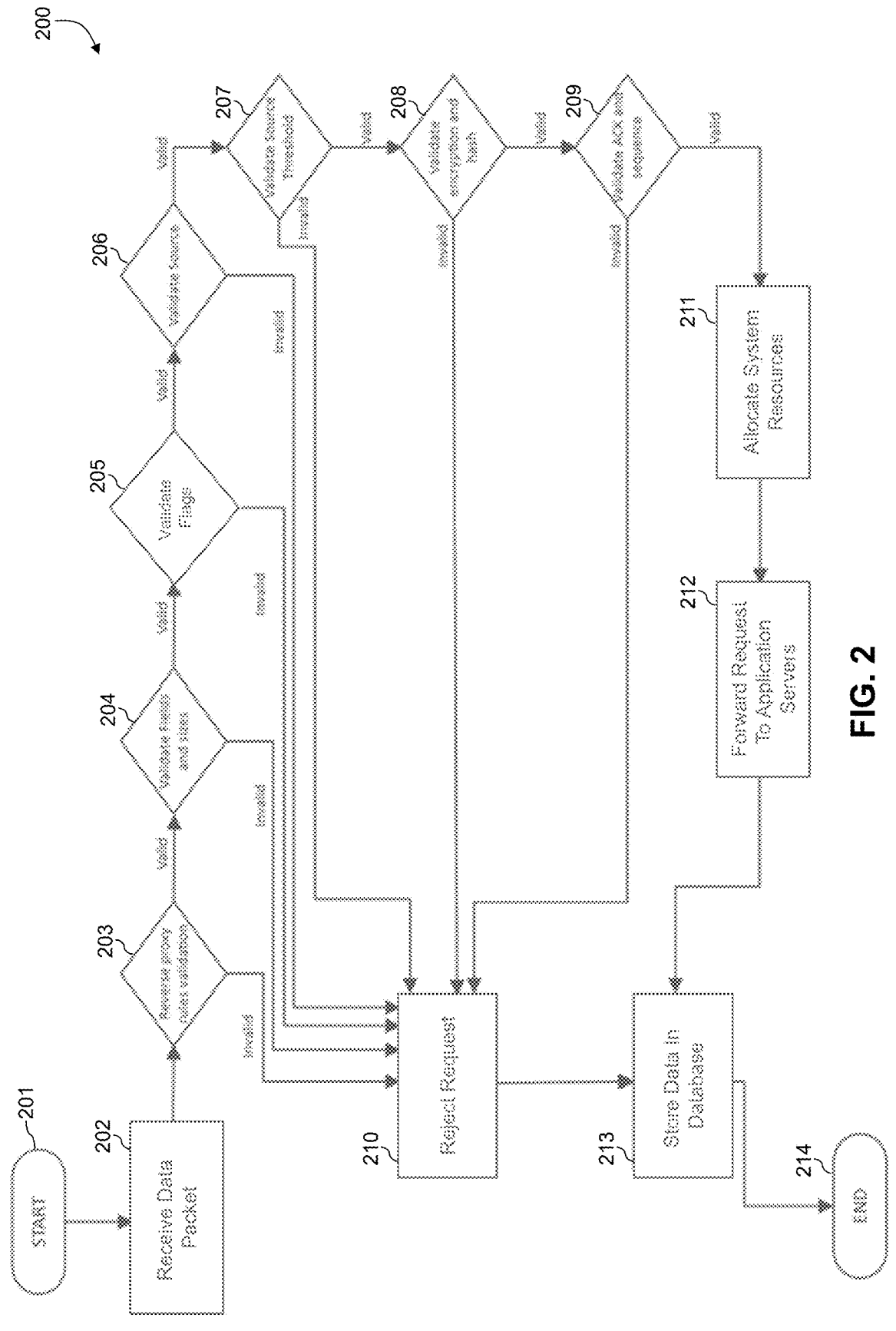
FIG. 2 depicts an operational flow for data validation of TCP requests in an illustrative embodiment.

Referring to the operational flow 200 for data validation of TCP requests in FIG. 2, at a start 201 of the operational flow 200, a data packet is received (receive data packet) at step 202. Then at step 203, reverse proxy rules validation is performed. If the data packet is found to be valid following reverse proxy rules validation, then header fields and their sizes are validated at step 204 (validate fields and sizes). If the data packet is found to be valid following validation of header fields and their sizes, then at step 205 flags are validated (validate flags). If the data packet is found to be valid following validation of flags, then at step 206 a source of the data packet is validated (validate source). If the data packet is found to be valid following validation of the source, then at step 207, a determination is made whether the data packet originates from the same source as other data packets and whether a number of data packets from the same source exceeds a designated threshold (validate source threshold). If the data packet is found to be valid following validation of the source threshold, then at step 208, encryption methods and hash values in the data packet are validated (validate encryption and hash). If the data packet is found to be valid following validation of encryption methods and hash values, then at step 209, acknowledgment (ACK) and sequence numbers in the data packet are validated (validate ACK and sequence). If the data packet is found to be invalid at any of steps 203-209, then the TCP request is rejected at step 210 (reject request).

If the data packet is found to be valid following validation of encryption methods and hash values at step 208, then, following acknowledgment and sequence number validation at step 209, at step 211, system resources (e.g., servers 160) corresponding to the request are allocated to respond to the request (allocate system resources). At step 212 (forward request to application servers), the request is forwarded to the allocated servers 160 by, for example, the service handler 133 and/or the upload handler 134. At step 213 (store data in database), data regarding the results of validation in steps 203-209, whether a request is rejected or approved, and allocated system resources are stored in the database 136. The operational flow 200 ends at step 214.

Regarding the operational flow 200, in connection with steps 203-209, received data packets and their headers are scanned and validated for structural abnormalities. For example, the protocol handler 132 verifies different flags and header fields. Header fields can comprise, for example, source port and destination port data (e.g., IP address, port), sequence number and acknowledgement number. Sequence numbers and acknowledgement numbers comprise unique 32-bit number combinations assigned to a data packet. An initial sequence number (ISN) refers to the unique 32-bit sequence number assigned to a new connection on a TCP-based data communication. An ISN generated by, for example, an application client device 102 can be 1234567890. At this point, since the application client device 102 is initiating the connection and has not received a reply from a server 160, the acknowledgment number is set to 0. If a request is validated, the server 160 receives the request and generates a reply containing its own generated ISN, for example, 3456789123, and the next sequence number the application client device 102, which is 1234567891.

The received data packet may also set flags such as, for example, SYN, ACK, FIN, PSH, RST, URG flags, where 0 for a flag in a header indicates that the flag has not been set, and 1 in a header indicates that the flag has been set. The protocol handler 132 verifies whether the sequence numbers and acknowledgement numbers are correct, and determines whether the flags are properly set based on the circumstances or the type of data or service corresponding to a request. For example, a server 160 may have SYN and ACK flags set, acknowledging receipt of a previous packet and informing the application client device 102 of its own sequence number. In some cases, the protocol handler 132 may determine that the setting of a flag or lack thereof is not logically appropriate for a given set of circumstances. For example, as noted herein, the protocol handler 132 is configured to detect urgent [URG] and other flags that are improperly set for certain types of data or requests. The protocol handler 132 may rely on rules or other information stored in the database 136 regarding the propriety of certain flags for designated data types and/or requests.

The protocol handler 132 verifies reserved header fields, whether the sizes of different header fields are within a designated range, whether the size of the header is within a designated range, verifies packet data against a window size field and verifies encryption and hash data. In a non-limiting operational example, the client module 130/630/730 processes transport layer protocol (e.g., TCP) handshakes. For example, secure sockets layer (SSL) level encryption may be used for encrypting hash values for SYN cookies. The hash value of an incoming SYN request from an application client device 102 is computed by the protocol handler 132 and stored in the database 136 (step 1 of the handshake). In response to the request, the encrypted value is sent to the application client device 102 as part of SYN and ACK response (step 2 of handshake). A final ACK (step 3 of the handshake) from the application client device 102 includes the encrypted value +1 as the sequence number. A hacker will fail to catch the response of step 2 of the handshake and a hacker would fail to include this expected sequence number in the final ACK packets. Only the ACK packets with proper sequence numbers will be accepted. With reference again to FIG. 2, at step 211, system resources are to be allocated to a connection socket only after there is a final ACK received from application client device 102 and it is validated. With respect to step 213, relevant portions (e.g., tables) in the database 136 are updated with data corresponding to the socket connection and web operations requested from application client device 102 can be commenced.

With regard to step 207, a determination is made as to whether a data packet originates from the same source as other data packets and whether a number of data packets from the same source exceeds a designated threshold. In a non-limiting operational example, the client module 130/630/730 validates protocol (e.g., TCP) requests for signs of flooding, and blocks multiple SYN requests (SYN flooding) from the same IP address based on stored values of SYN requests from the same IP address in the database 136. In order to avoid situations where more than one SYN request may be needed (e.g., the same client sends a second SYN request if it fails to receive a response for the first SYN request), the client module 130/630/730 will have a designated threshold number of SYN requests from the same IP address to determine whether a flooding attack is being perpetrated and the SYN requests should be rejected. In connection with avoiding ACK flooding, the client module 130/630/730 validates sequence numbers of every ACK response by comparing it with a sequence series stored in the database 136.

In connection with the operational flow 200 in FIG. 2, at step 202, a data packet corresponding to a communications protocol request (e.g., TCP request) is received. In connection with steps 203-209, the data packet is scanned to validate one or more elements corresponding to the communications protocol request. At step 210, the communications protocol request is rejected in response to invalidating the one or more elements. At step 212, the communications protocol request is forwarded to one or more servers 160 in response to validating the one or more elements. The one or more elements comprise, for example, one or more header fields and one or more flags. Validating the one or more elements comprises determining whether the one or more elements comply with one or more reverse proxy rules, determining whether a size of the one or more header fields exceeds a designated threshold, verifying a source port and/or a destination port identified in the one or more header fields, and verifying a sequence number and/or an acknowledgement number in the one or more header fields.

As noted herein above, the communications protocol request may comprise a SYN request to initiate a new connection and the one or more elements comprises a hash value for the request to initiate the new connection. In connection with identifying a flooding attack, the client module 130/630/730 identifies a plurality of data packets comprising a communications protocol request to initiate a new connection (SYN request) originating from the same IP address, determines whether a number of the plurality of the data packets exceeds a designated threshold, and rejects the communications protocol requests to initiate the new connection corresponding to the plurality of the data packets in response to determining that the number of the plurality of the data packets exceeds the designated threshold.

Figure 3:
FIG. 3 depicts an operational flow for data validation of TCP responses in an illustrative embodiment.

Referring to the operational flow 300 for data validation of TCP responses in FIG. 3, at start 301 of the operational flow 300, at step 302, one or more data packets corresponding to at least one response to a communications protocol request are received from one or more of the servers 160 (receive data from application servers). Then at step 303, forward proxy rules validation is performed (validate with forward proxy rules). For example, the protocol handler 132 scans the one or more data packets to validate one or more elements corresponding to the at least one response. Validating the one or more elements corresponding to the at least one response comprises determining whether the one or more elements corresponding to the at least one response comply with one or more forward proxy rules from the database 136. If the data packet is found to be valid following forward proxy rules validation, then at step 304, headers and fields data are captured (capture headers and fields data). At step 305, the captured headers and fields data are sent to a user (e.g., to an application client device 102), and at step 307, the captured data is stored in the database 136. If the data packet is found to be invalid at step 303, then the TCP response is rejected at step 306 (reject request). Data regarding the rejected request is stored in the database 136 at step 307. The operational flow 300 ends at step 308.

According to illustrative embodiments, the client module 130/630/730 is installed within the datacenter 110/610 with administrator and/or root access. The client module 130/630/730 can be configured with designated web services, application services, database services and other services that the client module 130/630/730 will protect. In addition, client module 130/630/730 can be configured with designated APIs of the designated web services, application services, database services and other services that users will be calling. For example, there might be APIs which are required to be used within the datacenter 110/610, and any non-designated APIs or calls thereto can be blocked.

The client module 130/630/730 can also be configured with designated validation parameters of web requests including, for example, field level or API contract level validations that users may want performed. Limitations on the number of calls per API may also be designated. Periodic clean up schedules for databases (e.g., database 136) and logs can also be designated or a default cleanup schedule can be utilized to prevent the sizes of the databases and/or logs from exceeding desired disk usage.

In one or more embodiments, a configuration of an organization's reporting console can be specified so that the applications of the client module 130/630/730 can be easily plugged into an organization's reporting console. The client module 130/630/730 is also configured with rule set for the bi-directional proxy layer 131. The rule set comprises inbound and outbound filters related to reverse and forward proxy validation, along with the approved and blocked configurations.

Referring to FIG. 6, an architecture 600 includes a plurality of datacenters 610 including respective client modules 630 that are connected to a CDN server 680, which is connected to a backend server 690. Similarly, FIG. 7 shows an architecture 700 with multiple client modules 730 respectively connected to CDN servers 780-1, 780-2 and 780-3 (collectively "CDN servers 780"). The CDN servers 780 are connected to backend server 790. The CDN servers 780 are configured the same as or similar to the CDN server 680. The backend server 790 is configured the same as or similar to the backend server 690. The CDN servers 680/780 provide local support for client modules 630/730 (and client module 130) and are deployed on a zone level (e.g., continent/region/area based). As the number of clients can be high, it will take large amounts of processing time for all client modules 130/630/730 to directly communicate with a backend server 690/790. To avoid this, intermediate CDN servers 680/780 are deployed at a reachable limit for faster access to services by the client modules 130/630/730. Protocol filter content generated by the backend servers 690/790 can be stored at the local CDN servers 680/780. Different communication protocol filter events can be uploaded from the client modules 130/630/730 to the CDN servers 680/780, and will further be uploaded to the backend servers 690/790 for additional processing and generation of enhanced definitions and patterns for communication protocol filtration.

The backend servers 690/790 will be located at a backend and function as a central service provider for all of the CDN servers 680/780. The backend servers 690/790 obtain large amounts of data as uploads from the CDN servers 680/780 and process the data.

In illustrative embodiments, the backend servers 690/790 perform the following tasks: (i) receive data uploaded from client modules 130/630/730 (via CDN servers 680/780) and process the uploaded data; (ii) run machine learning analysis to generate predictions to avert future failures to identify improper requests and enhance transport layer protection;

and (iii) pass the predictive analysis data periodically to client modules 130/630/730 (via CDN servers 680/780) to improve request validation and increase security.

According to one or more embodiments, the database 136, storage module 170 and other data repositories or databases referred to herein can be configured according to a relational database management system (RDBMS) (e.g., PostgreSQL). In some embodiments, the database 136, storage module 170 and other data repositories or databases referred to herein are implemented using one or more storage systems or devices associated with the datacenter 110. In some embodiments, one or more of the storage systems utilized to implement the database 136, storage module 170 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The firewall 120, client module 130, network switch 140, storage fabric module 150, servers 160, storage module 170 and one or more elements thereof in the FIG. 1 embodiment are each assumed to be implemented using at least one processing device. Each such processing device generally comprises at least one processor and an associated memory, and implements one or more functional modules for controlling certain features of firewall 120, client module 130, network switch 140, storage fabric module 150, servers 160, storage module 170 and one or more elements thereof.

At least portions of the firewall 120, client module 130, network switch 140, storage fabric module 150, servers 160, storage module 170 and one or more elements thereof may be implemented at least in part in the form of software that is stored in memory and executed by a processor. The firewall 120, client module 130, network switch 140, storage fabric module 150, servers 160, storage module 170 and one or more elements thereof comprise further hardware and software required for running the datacenter 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

It is assumed that the datacenter 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the firewall 120, client module 130, network switch 140, storage fabric module 150, servers 160, storage module 170 and one or more elements thereof can each be implemented in the form of one or more LXCs running on one or more VMs. Other arrangements of one or more processing devices of a processing platform can be used to implement the firewall 120, client module 130, network switch 140, storage fabric module 150, servers 160, storage module 170 and one or more elements thereof. Other portions of the system 100 can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements such as the firewall 120, client module 130, network switch 140, storage fabric module 150, servers 160, storage module 170 and one or more elements thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the datacenter 110 can be offered to cloud infrastructure customers or other users as part of FaaS, CaaS and/or PaaS offerings.

The operation of the information processing system 100 will now be described in further detail with reference to the flow diagram of FIG. 8. With reference to FIG. 8, a process 800 for prevention of transport layer attacks as shown includes steps 802 through 808, and is suitable for use in the system 100 but is more generally applicable to other types of information processing systems comprising a datacenter including a client module configured for preventing transport layer attacks in a datacenter.

In step 802, one or more data packets corresponding to at least one communications protocol request are received. In an illustrative embodiment, the at least one communications protocol request comprises a TCP request. In step 804, the one or more data packets are scanned to validate one or more elements corresponding to the at least one communications protocol request. In illustrative embodiments, the one or more elements comprise at least one of one or more header fields and one or more flags. Validating the one or more elements comprises determining whether the one or more elements comply with one or more reverse proxy rules, determining whether a size of the one or more header fields exceeds a designated threshold, verifying at least one of a source port and a destination port identified in the one or more header fields, and/or verifying at least one of a sequence number and an acknowledgement number in the one or more header fields.

In step 806, the at least one communications protocol request is rejected in response to invalidating the one or more elements. In step 808, the at least one communications protocol request is forwarded to one or more servers in response to validating the one or more elements. In one or more embodiments, information corresponding to at least one of a rejected communications protocol request and a forwarded communications protocol request is stored in one or more databases. The at least one communications protocol request may comprise a request to initiate a new connection and the one or more elements may comprise a hash value for the request to initiate the new connection.

The process may further comprise identifying a plurality of the one or more data packets comprising a communications protocol request to initiate a new connection originating from the same IP address, determining whether a number of the plurality of the one or more data packets exceeds a designated threshold, and rejecting the communications protocol requests to initiate the new connection corresponding to the plurality of the one or more data packets in response to determining that the number of the plurality of the one or more data packets exceeds the designated threshold.

The process may further comprise receiving one or more additional data packets corresponding to at least one response to the at least one communications protocol request, and scanning the one or more additional data packets to validate one or more elements corresponding to the at least one response. Validating the one or more elements corresponding to the at least one response may comprise determining whether the one or more elements corresponding to the at least one response comply with one or more forward proxy rules.

In illustrative embodiments, the process is performed by a processing device operatively coupled to a memory. The processing device comprises an edge device located at a same location as the one or more servers. The edge device is connected to a content delivery network server and to a backend server through the content delivery network server.

It is to be appreciated that the FIG. 8 process and other features and functionality described above can be adapted for use with other types of information systems configured to prevent transport layer attacks in a datacenter or other type of platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with the client module 130/630/730 as disclosed herein can provide a number of significant advantages relative to conventional arrangements. For example, the client module 130/630/730 comprises a lightweight application in an edge device located in a datacenter. The application is configured to prevent transport layer attacks such as, for example, DDOS attacks. The client module 130/630/730 advantageously monitors network traffic coming into a datacenter and based on designated policies and rules, analyzes data packets to determine whether the data packets are properly structured and/or are not indicative of flooding attacks. The client module 130/630/730 further ensures that proper handshakes, sequencing, and system resource allocation are being implemented between application client devices (e.g., web clients) and datacenter servers responding to requests from the application client devices. The client module 130/630/730 is strategically located in a datacenter in an edge device as a local line of defense against transport layer threats.

As an additional advantage, illustrative embodiments provide a proactive method and self-learning model to intelligently verify network requests to detect transport layer attacks such as, for example, SYN flooding attacks in complex edge datacenter environments. As an additional advantage, the illustrative embodiments postpone the allocation of resources (e.g., servers 160) until a network request successfully passes the disclosed validation process.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the datacenter 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a datacenter in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
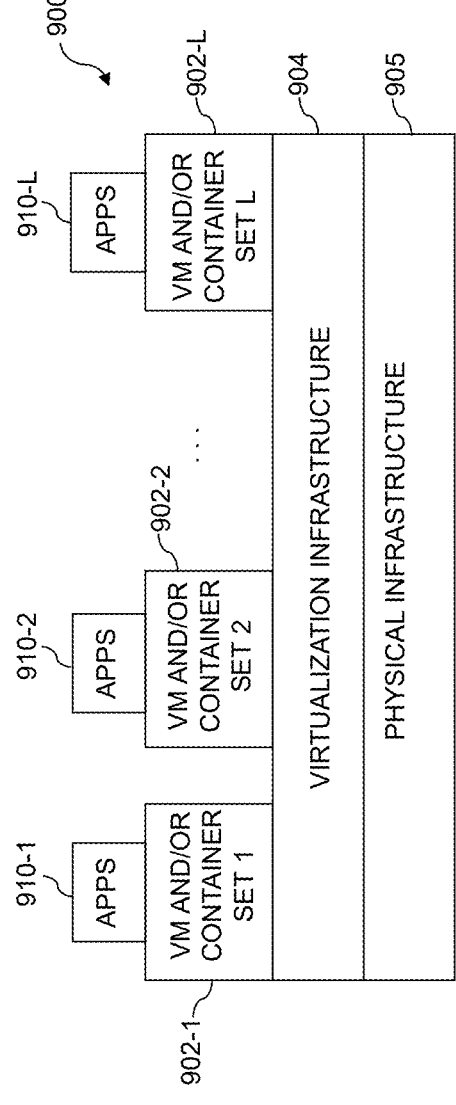
FIGS. 9 and 10 show examples of processing platforms that may be utilized to implement at least a portion of an information processing system according to illustrative embodiments.
Figure 10:
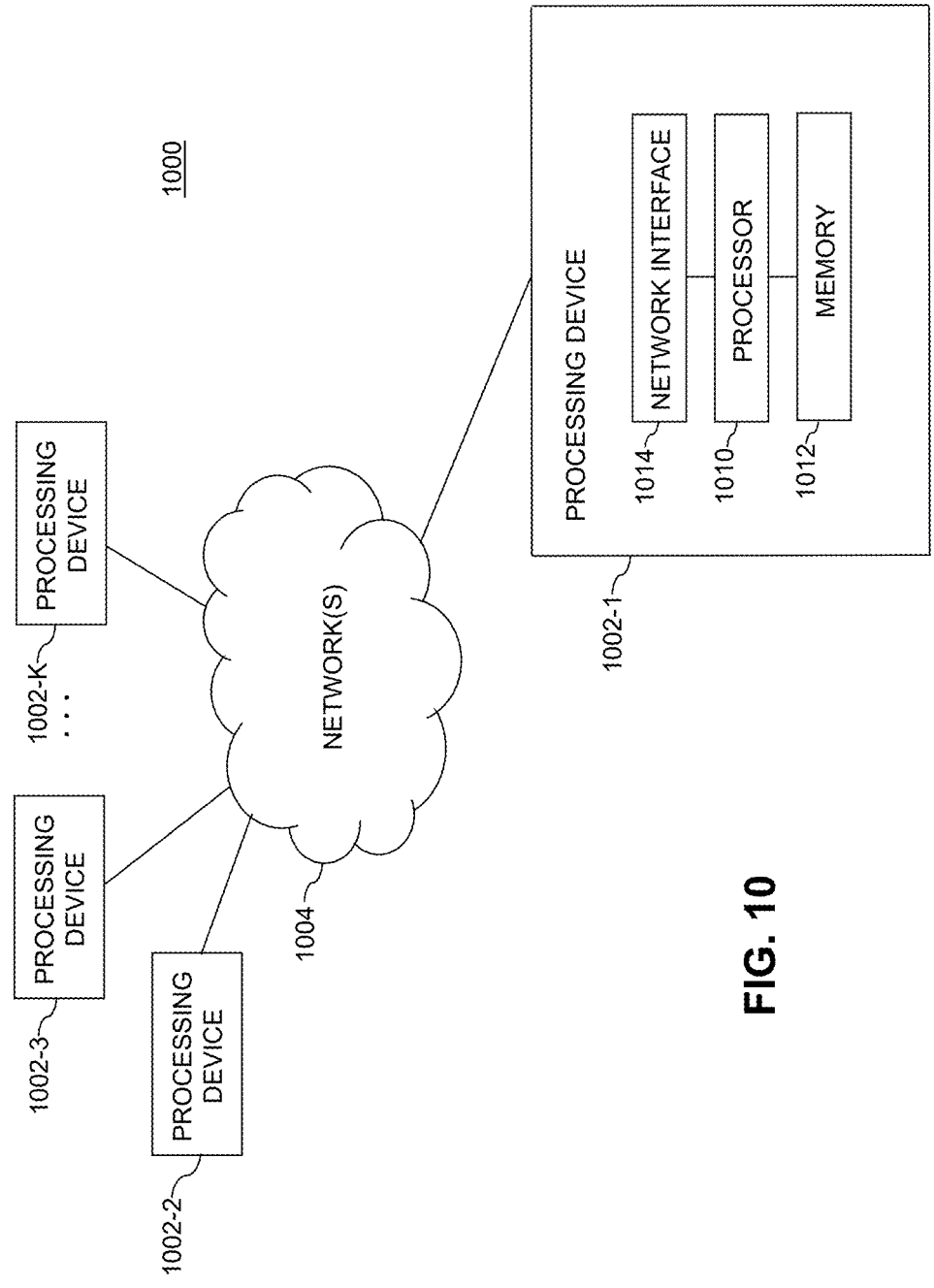

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the datacenter 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and datacenters. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

receiving one or more data packets corresponding to at least one communications protocol request;

scanning the one or more data packets to validate one or more elements corresponding to the at least one communications protocol request;

rejecting the at least one communications protocol request in response to invalidating the one or more elements; and forwarding the at least one communications protocol request to one or more servers of a data center in response to validating the one or more elements;

storing information corresponding to one or more rejected communications protocol requests and one or more forwarded communications protocol requests in one or more databases;

sending the one or more rejected communications protocol requests and one or more forwarded communications protocol requests to a machine learning model to generate one or more predictions of one or more improper requests based on the one or more stored rejected communications protocol requests and the one or more stored forwarded communications protocol requests; and receiving the one or more predictions from the machine learning model and storing the one or more predictions in the one or more databases;

wherein the steps of the method are executed by a processing device operatively coupled to a memory, and the processing device resides in the data center and is connected behind a firewall component of the data center and between the firewall component and the one or more servers of the data center, and wherein the firewall component is further connected to a content delivery network server and to a backend server through the content delivery network server.

2. The method of claim 1 wherein the at least one communications protocol request comprises a transmission control protocol request.

3. The method of claim 1 wherein the one or more elements comprise at least one of one or more header fields and one or more flags.

4. The method of claim 3 wherein validating the one or more elements comprises determining whether a size of the one or more header fields exceeds a designated threshold.

5. The method of claim 3 wherein validating the one or more elements comprises verifying at least one of a source port and a destination port identified in the one or more header fields.

6. The method of claim 3 wherein validating the one or more elements comprises verifying at least one of a sequence number and an acknowledgement number in the one or more header fields.

7. The method of claim 1 wherein the at least one communications protocol request comprises a request to initiate a new connection and the one or more elements comprises a hash value for the request to initiate the new connection.

8. The method of claim 1 further comprising:

identifying a plurality of the one or more data packets comprising a communications protocol request to initiate a new connection originating from the same Internet Protocol address;

determining whether a number of the plurality of the one or more data packets exceeds a designated threshold; and rejecting the communications protocol requests to initiate the new connection corresponding to the plurality of the one or more data packets in response to determining that the number of the plurality of the one or more data packets exceeds the designated threshold.

9. The method of claim 1 wherein validating the one or more elements comprises determining whether the one or more elements comply with one or more reverse proxy rules.

10. The method of claim 1 further comprising:

receiving one or more additional data packets corresponding to at least one response to the at least one communications protocol request; and scanning the one or more additional data packets to validate one or more elements corresponding to the at least one response.

11. The method of claim 10 wherein validating the one or more elements corresponding to the at least one response comprises determining whether the one or more elements corresponding to the at least one response comply with one or more forward proxy rules.

12. The method of claim 1 wherein the processing device comprises an edge device located at a same location as the one or more servers.

13. An apparatus comprising:

a processing device comprising a processor operatively coupled to a memory and configured:

to receive one or more data packets corresponding to at least one communications protocol request;

to scan the one or more data packets to validate one or more elements corresponding to the at least one communications protocol request;

to reject the at least one communications protocol request in response to invalidating the one or more elements; and to forward the at least one communications protocol request to one or more servers of a data center in response to validating the one or more elements;

storing information corresponding to one or more rejected communications protocol requests and one or more forwarded communications protocol requests in one or more databases;

sending the one or more rejected communications protocol requests and one or more forwarded communications protocol requests to a machine learning model to generate one or more predictions of one or more improper requests based on the one or more stored rejected communications protocol requests and the one or more stored forwarded communications protocol requests; and receiving the one or more predictions from the machine learning model and storing the one or more predictions in the one or more databases;

wherein the processing device resides in the data center and is connected behind a firewall component of the data center and between the firewall component and the one or more servers of the data center, and wherein the firewall component is further connected to a content delivery network server and to a backend server through the content delivery network server.

14. The apparatus of claim 13 wherein the at least one communications protocol request comprises a request to initiate a new connection and the one or more elements comprises a hash value for the request to initiate the new connection.

15. The apparatus of claim 13 wherein the processing device is further configured:

to identify a plurality of the one or more data packets comprising a communications protocol request to initiate a new connection originating from the same Internet Protocol address;

to determine whether a number of the plurality of the one or more data packets exceeds a designated threshold; and to reject the communications protocol requests to initiate the new connection corresponding to the plurality of the one or more data packets in response to determining that the number of the plurality of the one or more data packets exceeds the designated threshold.

16. The apparatus of claim 13 wherein the at least one communications protocol request comprises a transmission control protocol request.

17. The apparatus of claim 13 wherein the one or more elements comprise at least one of one or more header fields and one or more flags.

18. An article of manufacture comprising a non-transitory processor-readable storage medium having stored therein program code of one or more software programs, wherein the program code when executed by at least one processing device causes said at least one processing device to perform the steps of:

receiving one or more data packets corresponding to at least one communications protocol request;

scanning the one or more data packets to validate one or more elements corresponding to the at least one communications protocol request;

rejecting the at least one communications protocol request in response to invalidating the one or more elements; and forwarding the at least one communications protocol request to one or more servers of a data center in response to validating the one or more elements;

storing information corresponding to one or more rejected communications protocol requests and one or more forwarded communications protocol requests in one or more databases;

sending the one or more rejected communications protocol requests and one or more forwarded communications protocol requests to a machine learning model to generate one or more predictions of one or more improper requests based on the one or more stored rejected communications protocol requests and the one or more stored forwarded communications protocol requests; and receiving the one or more predictions from the machine learning model and storing the one or more predictions in the one or more databases;

wherein the processing device resides in the data center and is connected behind a firewall component of the data center and between the firewall component and the one or more servers of the data center, and wherein the firewall component is further connected to a content delivery network server and to a backend server through the content delivery network server.

19. The article of manufacture of claim 18 wherein the at least one communications protocol request comprises a request to initiate a new connection and the one or more elements comprises a hash value for the request to initiate the new connection.

20. The article of manufacture of claim 18 wherein the program code further causes said at least one processing device to perform the steps of:

identifying a plurality of the one or more data packets comprising a communications protocol request to initiate a new connection originating from the same Internet Protocol address;

determining whether a number of the plurality of the one or more data packets exceeds a designated threshold; and rejecting the communications protocol requests to initiate the new connection corresponding to the plurality of the one or more data packets in response to determining that the number of the plurality of the one or more data packets exceeds the designated threshold.

* * * * *